(No Model.)
W. A. WOODROFFE.
CUTTER HEAD.
No. 348,367. Patented Aug. 31, 1886.
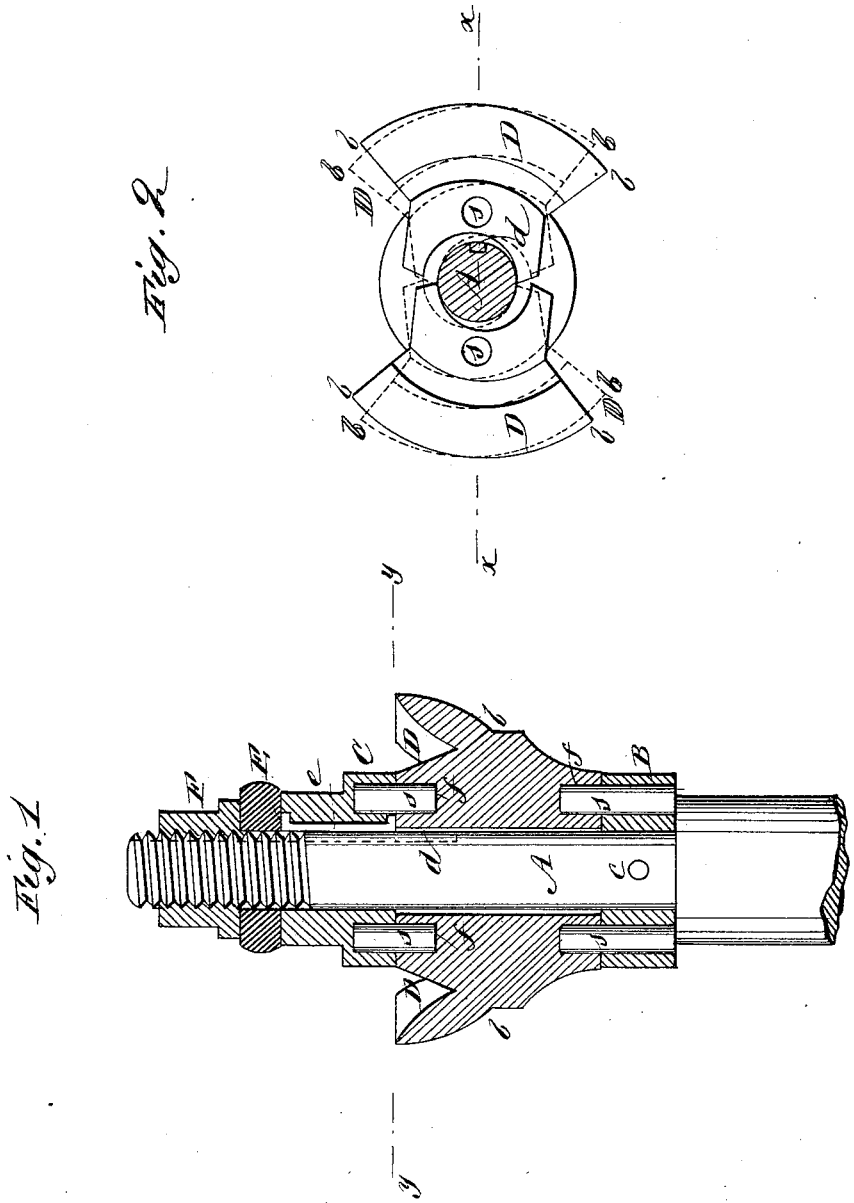
WITNESSES:
C. Neveux
C. Sedgwick
INVENTOR:
W. A. Woodroffe
BY Munn & Co.
ATTORNEYS.

UNITED STATES PATENT OFFICE.

WILLIAM ARTHUR WOODROFFE, OF MECHUM'S RIVER, VIRGINIA.

CUTTER-HEAD.

SPECIFICATION forming part of Letters Patent No. 348,367, dated August 31, 1886.

Application filed December 16, 1885. Serial No. 185,842. (No model.)

*To all whom it may concern:*

Be it known that I, WILLIAM ARTHUR WOODROFFE, of Mechum's River, in the county of Albemarle and State of Virginia, have invented a new and useful Improvement in Cutter-Heads and their Cutters for Edge-Molding and other purposes, of which the following is a full, clear, and exact description.

This invention relates to wood-shapers or cutter-heads, with attached cutters, having a rotary motion and capable of cutting in opposite directions of rotation, the same including solid friezing and edging cutters or cutter-heads for making moldings and other ornamental work.

My invention has mainly for its object the securing of better back clearance for the cutters and doing away with that friction on the work which, in the case of the ordinary solid cutters or cutter-head with fixed cutters, is produced by the rubbing of either cutting-edge which is in the wake, according to the direction of rotation, against the work.

The invention consists in a novel construction of the cutter-head having combined with it one or more oscillating or shifting cutters, substantially as hereinafter described, whereby the above-named and other objects are very perfectly secured.

Reference is to be had to the accompanying drawings, forming a part of this specification, in which similar letters of reference indicate corresponding parts in both the figures.

Figure 1 represents a mainly sectional longitudinal or vertical view, upon the line $x\ x$ in Fig. 2, of an edge-molding cutter-head and cutters embodying my invention, and Fig. 2 a transverse section of the same upon the line $y\ y$ in Fig. 1.

A indicates the upright spindle or shaft which carries the cutter-head, and which is made to rotate in reverse directions, as required, by any suitable means.

B and C are bottom and top collars on said shaft, between which, on opposite sides of the shaft, the double or reverse edging-cutters D D are arranged, each of said cutters being constructed with opposite side cutting-edges $b\ b$. Both collars B and C are kept from turning upon the shaft by any suitable means; also, the bottom collar, B, is made removable to provide for its replacement by a collar of different size when the wear of the cutters requires such change. Thus the bottom collar, B, may be scured to the shaft by a removable cross-pin, $c$, or it may be otherwise removably secured, and the top collar, C, be removably connected with the shaft and so as also to turn with it by a slot, $d$, in the shaft, and a key, $e$, in the collar, or in any other convenient manner.

E is a rubber or other spring arranged above the top collar, C, and F an adjustable fastening or nut screwing upon the upper end of said shaft for controlling said spring and for holding the top collar down to its place on the cutters. This spring not only gives an elastic pressure on the cutters and serves to hold them steady when at work, but allows them to move or be shifted when the motion of the spindle or shaft is reversed, as hereinafter described.

The cutters D D, which may be variously shaped on their cutting-edges $b\ b$, according to the work to be done, are separate structures or devices, and are in pivoted connection with the cutter-head, as, for instance, by pivots or pins $s\ s$, arranged to project from the inner faces of the collars B C outside of the shaft A, but parallel with it, and made to freely or loosely enter holes or bearing-recesses $f\ f$ in the cutters; or, which would be an equivalent construction, the pins $s\ s$ may be carried by the cutters and freely enter holes or recesses in the collars. The inner margins of the cutters are made to loosely hug the shaft A, so as to afford lateral play to the cutters about the pivots $s\ s$ as centers, and so that the opposite ends of said inner marginal portions of the cutters will alternately bear against the shaft as the work bears against either cutting-edge $b$ in reverse rotations of the cutter-head with its pivoted cutters, as shown by full and dotted lines in Fig. 2. This causes the acting cutting-edge of either cutter to be thrown outward and into the line of cut, and the opposite cutting-edge of the same cutter back and out of the way, thus giving a ready back clearance and doing away with rubbing of the cutting-edge, which is in the wake upon the work, and thereby reducing friction. The antomatic or oscillating adjustment of the cutters, as the rotation of the cutter-head is reversed, also provides for the cutters being turned up in one piece from one center, instead of turning them up from two centers, as heretofore done, in making solid reversible cutters—that is, cutter-heads having fixed cutters provided with double or reversed cutting-edges.

If desired, each cutter may be carried only by a single pivot, s, either in the upper or lower collar, instead of by two pivots, as shown; also, if desired, but a single loose pivoted cutter, D, instead of two cutters, may be used and combined with the head.

Having thus fully described my invention, I claim as new and desire to secure by Letters Patent—

1. The combination, with a spindle, one or more pivoted reversible cutters, and a collar fitted to slide upon said spindle, of the spring held and resting upon said sliding collar and a clamping-nut for the same, substantially as and for the purpose set forth.

2. In reversely-rotating cutter-heads having attached cutters provided with opposite or reverse cutting-edges, the combination of the spindle or shaft A, the collars B C, arranged upon said spindle, the loose double or reverse edged cutters D D, disposed between said collars, the pivots s s, seated or bearing in said collars, the spring E, and an adjustable fastening arranged to control the spring and to hold the whole to their places, with freedom for adjustment of the cutters as the motion of the cutter-head is reversed, said spring and fastening being arranged upon said spindle, and the spring bearing upon the collar C, and the fastening resting upon the spring, substantially as specified.

WILLIAM ARTHUR WOODROFFE.

Witnesses:
  THOS. WOODROFFE,
  L. R. SNEAD.